US009053283B2

(12) United States Patent
Chen et al.

(10) Patent No.: US 9,053,283 B2
(45) Date of Patent: Jun. 9, 2015

(54) METHODS FOR LAYOUT VERIFICATION FOR POLYSILICON CELL EDGE STRUCTURES IN FINFET STANDARD CELLS USING FILTERS

(71) Applicant: Taiwan Semiconductor Manufacturing Company, Ltd., Hsin-Chu (TW)

(72) Inventors: Shih Hsin Chen, Hsin-Chu (TW); Kai-Ming Liu, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 55 days.

(21) Appl. No.: 13/840,221

(22) Filed: Mar. 15, 2013

(65) Prior Publication Data

US 2014/0282325 A1 Sep. 18, 2014
US 2015/0154339 A9 Jun. 4, 2015

Related U.S. Application Data

(60) Provisional application No. 61/778,006, filed on Mar. 12, 2013.

(51) Int. Cl.
*G06F 17/50* (2006.01)
*H01L 29/00* (2006.01)

(52) U.S. Cl.
CPC ............ *G06F 17/5081* (2013.01); *H01L 29/00* (2013.01)

(58) Field of Classification Search
CPC .................................................... G06F 17/50
USPC ......................................... 716/104, 119, 138
See application file for complete search history.

(56) References Cited

U.S. PATENT DOCUMENTS

| 5,633,524 A | 5/1997 | Ueda et al. |
| 7,446,002 B2 | 11/2008 | Mears et al. |
| 8,739,104 B1 | 5/2014 | Penzes et al. |
| 2008/0185650 A1 | 8/2008 | Chen et al. |

(Continued)

OTHER PUBLICATIONS

Bhoj, A. N., et al., "Gated-Diode FinFET DRAMs: Device and Circuit Design-Considerations.," ACM Journal on Emerging Technologies in Computing Systems, vol. 6,No. 4,Dec. 2010, pp. 12.1-12:32.

(Continued)

*Primary Examiner* — Thuan Do
(74) *Attorney, Agent, or Firm* — Slater & Matsil, L.L.P (57) ABSTRACT

Methods for verifying the layout for standard cells using finFET standard cell structures with polysilicon on cell edges. Standard cells are defined using finFET transistors. Polysilicon dummy structures are formed on the edges of the active areas of the standard cells. Where two standard cells abut a single polysilicon dummy structure is formed. In a design flow, a pre-layout netlist schematic for the standard cells is formed that does not include devices corresponding to the polysilicon dummy structures. After an automated place and route process forms a device layout using the standard cells, a post layout netlist schematic is extracted including MOS devices corresponding to the polysilicon dummy structures. A layout versus schematic comparison is then performed, but during the comparison MOS devices corresponding to the polysilicon dummy structures are filtered from the post-layout netlist and are not compared. Additional methods are disclosed.

20 Claims, 6 Drawing Sheets

(56) References Cited

U.S. PATENT DOCUMENTS

2011/0055783 A1  3/2011  Yang
2012/0053923 A1  3/2012  Li et al.

OTHER PUBLICATIONS

Remy, L. et.al., "Definition of an Innovative Filling Structure for Digital Blocks: the DFM Filler Cell," 16th IEEE International Conference on Electronics, Circuits, and Systems, Dec. 2009, pp. 13-16, pp. 73-76.

Thijs, S. et.al., "Design Methodology of FinFET Devices that Meet IC-Level HBM ESD Targets," 30th Electrical Overstress/Electrostatic Discharge Symposium, Sep. 7-11, 2008, pp. 4A.4-1-4A.4-9.

Wright, P. et al., "A DFM Methodology to Evaluate the Impact of Lithography Conditions on the Speed of Critical Paths in a VLSI Circuit," Proceedings of the 7th International Symposium on Quality Electronic Design, 2006, pp. 1-4.

METHODS FOR LAYOUT VERIFICATION FOR POLYSILICON CELL EDGE STRUCTURES IN FINFET STANDARD CELLS USING FILTERS

This application claims the benefit of U.S. Provisional Application No. 61/778,006 filed on Mar. 12, 2013, entitled "Methods for Layout Verification for Polysilicon Cell Edge Structures in FinFET Standard Cells using Filters," which is hereby incorporated herein by reference in its entirety.

CROSS REFERENCE TO RELATED APPLICATION

The present application is related to co-pending U.S. patent application Ser. No. 13/840,789, entitled "Methods for Layout Verification for Polysilicon Cell Edge Structures in Fin-FET Standard Cells," filed contemporaneously, commonly assigned to the assignee of the present application, which application is hereby incorporated herein by reference in its entirety.

TECHNICAL FIELD

The embodiments relate generally to the use of finFET transistors to form standard cells for integrated circuits, and more specifically to the methods for layout versus schematic verification for finFET devices used in standard cell methodology when used for producing integrated circuits using automated place and route and design tools.

BACKGROUND

Designing integrated circuits to perform a user-defined function is time consuming and can extend time to market cycles. The use of standard cell libraries with automated placement and routing software tools was developed to shorten the time required to design and verify a new integrated circuit. By using predefined functional blocks that are already implemented as standard cells, the design cycle is shortened. Automated software tools can receive as input a functional description of a desired design in a schematic form and, using algorithms for cell placement and line routing, produce an integrated circuit layout that implements the schematic.

In addition, recent developments in transistor fabrication have replaced the conventional planar metal-oxide-semiconductor (MOS) transistor with finFET devices. By forming a three dimensional fin of semiconductor material, and fabricating metal or polysilicon gate structures over the fins, the gate width of the transistor can be longer for a given area, increasing device performance even as the semiconductor processes continue to shrink, and improving density. Standard cell libraries are now implemented using finFET transistors. However, the use of finFET transistors in the standard cell methodologies creates additional problems in verification.

BRIEF DESCRIPTION OF THE DRAWINGS

For a more complete understanding of the illustrative embodiments described herein, and the advantages thereof, reference is now made to the following descriptions taken in conjunction with the accompanying drawings, in which.

DETAILED DESCRIPTION

The making and using of example illustrative embodiments are discussed in detail below. It should be appreciated, however, that the embodiments provide many applicable inventive concepts that can be embodied in a wide variety of specific contexts. The specific embodiments discussed are merely illustrative of specific ways to make and use the various embodiments, and do not limit the scope of the specification, or the appended claims.

The use of standard cells to design integrated circuit provides a method to reduce the design cycle time needed to implement a new function in silicon by using a library of known functional primitive blocks. The blocks perform known functions, including for example but without limitation NAND-NAND, NAND-NOR, XOR, AND-OR logical blocks, and other functional blocks such as adders, multiplexers, de-multiplexers, flip-flops, register files, input and output buffers, and the like. Register files, stacks and other data storage blocks can also be part of the library of standard cells. By using a library of blocks that already have a verified layout defined at the transistor level, the need to perform the layout design for each new functional definition for an integrated circuit to be manufactured is eliminated.

Further, by defining the standard cell library using physical cell structures having a predetermined uniform layout pitch, dense packing of the cells can be obtained, so that a very dense placement of the transistors is achieved. Automatic placement and routing tools may be used with the standard cell library and the corresponding predefined layouts of the standard cells to further shorten the time needed to manufacture an integrated circuit that implements a user defined function.

In a standard cell design flow, a workstation, which can include, without limitation, a dedicated engineering computer station, a personal computer, a portable computer, a desktop, a tablet, a smartphone, an internet enabled portable web browser or other device and which may be communicating to a mainframe, VAX, micro-VAX, Apollo or other dedicated computing resource, is used by a designer to define a function to be implemented as an integrated circuit. Various software design tools for electronic design automation (EDA) including netlist to schematic translators, for example, Verilog to schematic, automated logic synthesis, mapping tools, layout tools, automated placement and routing tools, and verification tools are provided as a suite of software programs. Commercial vendors provide these tools. Simulation programs include functional simulators, which check the logical operation of a circuit, and many other electrical simulators such as PSPICE, HSPICE, SPICE, and others, which use parameterized models for the devices and check the electrical performance of the circuit including RC loading, rise and fall times, delays, and which can find race conditions, timing violations, and other "analog" effects that may occur even in "digital" circuits when implemented as transistors on a semiconductor wafer. Many other tools that are useful in standard cell design exist and are used, such as floorplanners, static and dynamic timing analyzers, critical net software, and the like. The netlists and netlist schematics are stored as files in non-transitory computer readable memories such as disk drives, thumb drives, mass storage, FLASH drives and memory that is non-volatile. In this manner, the user may, over several days, weeks or months, continue work with the software tools and the various data files until the design is complete.

Figure 1:
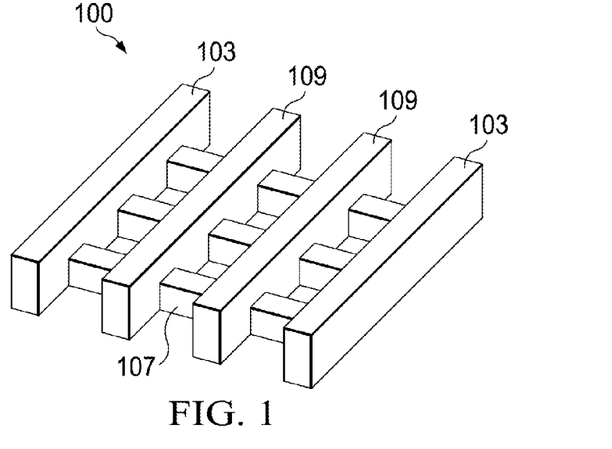
FIG. 1 illustrates, in a projection, a standard cell device formed with finFET transistors for use with the embodiments.

FIG. 1 illustrates, in a simplified projection view, a standard cell 100 for use with the various embodiments. The standard cell 100 is implemented using finFET transistors. In finFET transistors, a fin of semiconductor material is formed over an insulating layer. This semiconductor fin can include the source and drain regions for a transistor. The fin may have source and drain doped regions on either side of a channel region, or, in an alternative approach the fin may be uniformly doped. The fins may be formed using silicon on insulator (SOI) technology, or may be patterned from an epitaxial layer of semiconductor material such as silicon. In FIG. 1, fins 107 are arranged in parallel and extending across an active area or "OD" area for the standard cell 100.

Gate conductors 109 are shown formed in parallel and intersecting the fins 107 in the standard cell 100. Gate conductors 109 may be polysilicon, such as a doped polysilicon material, for example, formed over the fins. At the intersections between a gate conductor 109 and the semiconductor fins 107, a finFET metal-oxide-semiconductor (MOS) transistor may be formed by a thin gate dielectric, such as an oxide, nitride or low-k dielectric material formed between the gate polysilicon and the fin. When the finFET MOS transistors are compared to the conventional planar MOS transistors, finFET transistors have an expanded gate width per unit of silicon area because, unlike the planar MOS transistors used previously, the finFET MOs transistors have a gate region that includes the two vertical sides of the semiconductor fin, as well as the horizontal top portion, which greatly increases the gate width but without increasing the surface area of the integrated circuit needed, taking advantage of the three dimensional fin structure. FinFET MOS devices also tend to have higher performance in terms of leakage current, and lower susceptibility to short channel effects. As the device sizes continue to be reduced with higher performance semiconductor processes, the use of finFET MOS transistor devices is increasing.

Polysilicon structures 103 are formed on the edge of the standard cell 100. These polysilicon on OD edge ("PODE") structures are used to protect the ends of the semiconductor fins during processing. That is, the PODE polysilicon structures 103 are not electrically connected as gates for MOS devices but are instead "dummy" structures, having no function in the circuit. The PODE structures cover and protect the ends of the fins 107 in the cells, providing additional reliability during processing.

Figure 2:
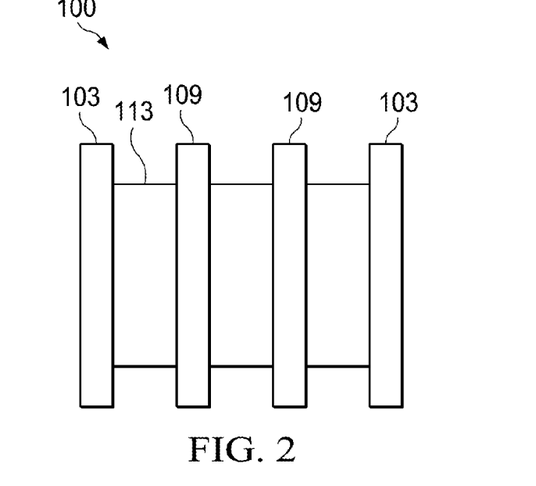
FIG. 2 illustrates, in a plan view, the standard cell of FIG. 1.

FIG. 2 depicts in a plan view the standard cell 100 of FIG. 1. In FIG. 2, the simplified plan view illustrates the active or OD area 113 for the cell 100, and the polysilicon structures including gates 109 and the PODE structures 103.

Figure 3:
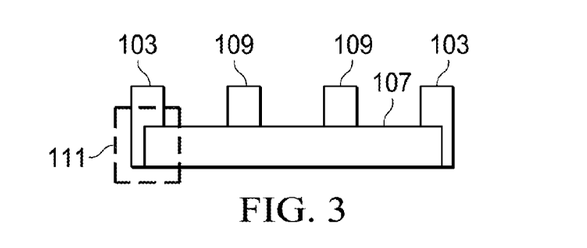
FIG. 3 illustrates, in a cross-sectional view, a portion of the standard cell of FIG. 1.

FIG. 3 depicts, in a cross section, a portion of the standard cell 11 shown in FIG. 1. In FIG. 3, the cross section is taken along one of the semiconductor fins 107 shown in FIG. 1. The polysilicon gates 109 are shown intersecting the fin 107; MOS transistors may be formed at the intersections of the fins and the gates. A gate dielectric material such as silicon dioxide, is formed over the fins and lies under the gates 109, but is not shown for simplicity. PODE structures 103 are shown at the edge of the standard cell 100 and protecting the ends of the semiconductor fin 107. Area 111 illustrates the relationship of the PODE 103 and the fin 107.

In a conventional standard cell design flow of the prior art, dummy polysilicon structures like the PODE structure 103 are sometimes modeled simply as unconnected wiring. However, the simulations used with this prior art approach are not accurate, because when polysilicon structures are formed over a portion of an active area, this forms an active device in the silicon produced, and this device adds parasitic capacitance, resistance, and may provide leakage current. Using a "wire" model for the PODE structures results in pre-layout and post-layout simulations that are not accurate. That is, because the models do not reflect the physical device, the simulations also do not accurately predict the performance of the silicon device that is eventually produced from the gate level design.

Figure 4A:
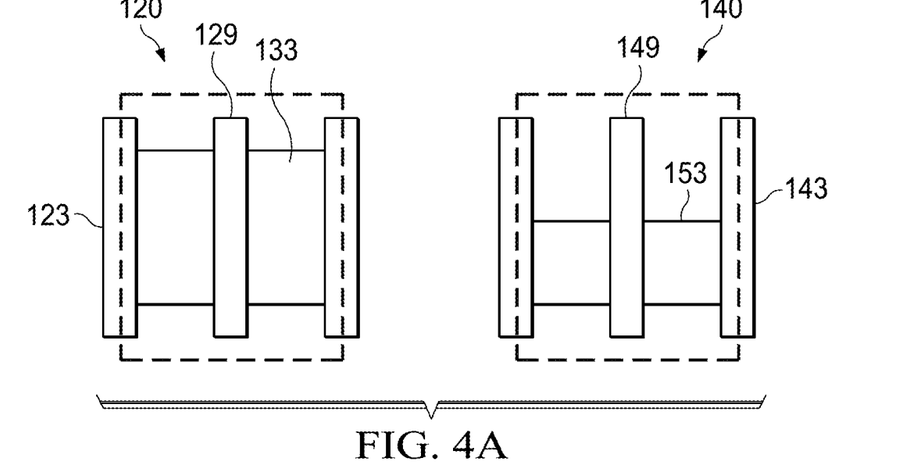
FIG. 4A illustrates, in a simplified plan view, a pair of standard cells use with the embodiments.
Figure 4B:
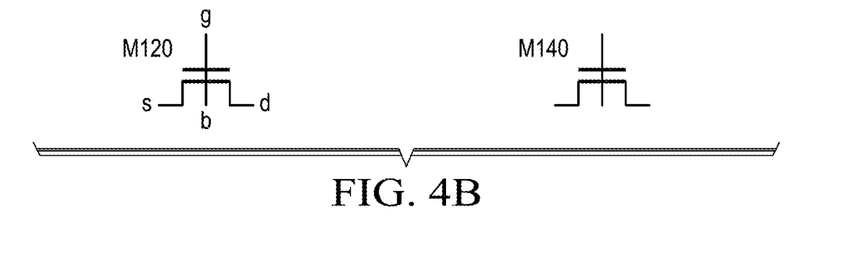
FIG. 4B illustrates a pre-layout schematic of the pair of standard cells of FIG. 4A
Figure 4C:
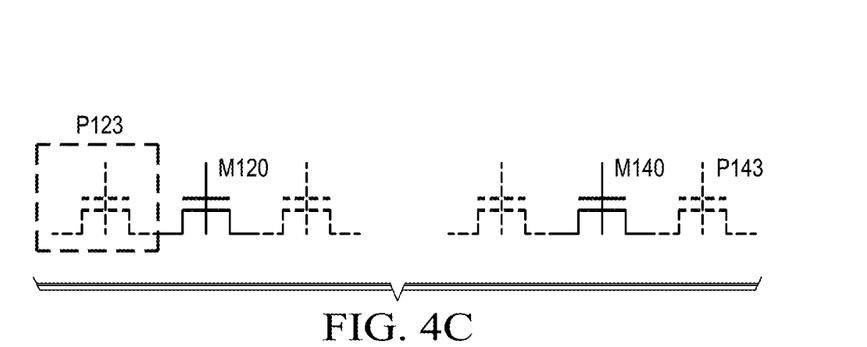
FIG. 4C illustrates a post-layout schematic of the pair of standard cells including dummy polysilicon on the cell edges.

FIGS. 4A, 4B and 4C illustrate the relationships between standard cell layouts, the pre-layout simulation schematic and the post-layout simulation schematic for example, non-limiting, two standard cells 120 and 140, including PODE structures. These standard cells are examples of cells which may be used with the various embodiments.

In FIG. 4A, in a plan view, standard cell 120, which may be a first sized MOS transistor, is shown with a gate 129 overlying an OD or active area 133. PODE structures 123 and 133 are shown at the edges of cell 120. Similarly, standard cell 140 is shown which may be, for example, a smaller sized MOS transistor. A gate 149 is shown overlying an OD or active area 153 with the PODE structure 143 at the edge of cell 140. Note that for a finFET device, the active area may be considered the "fin", but conventionally the active area means an oxide defined or OD area where devices may be formed in the standard cell. This terminology is used herein; the term "active area" is the OD area for the standard cell. A standard cell may have more than one active or OD area.

FIG. 4B illustrates a pre-layout simulation schematic for the standard cells 120 and 140. Essentially, in this simplified example, each of the standard cells 120 and 140 provides a single MOS transistor. In FIG. 4B, a transistor M120 is shown for the standard cell 120 and M140 for the standard cell 140. These "netlist1" models may be used to perform functional simulation of the device, for example. No parasitic information or layout related parameters are used in the pre-layout simulation. Note that the two cells 120 and 140 differ in the size of the active areas, so that the two transistors M120 and M140 may have different drive strengths, for example. These simple standard cells are presented here merely for illustration, and other standard cells in various embodiments may include additional transistors.

FIG. 4C illustrates a post-layout simulation netlist schematic for the standard cells 120 and 140. As shown in FIG. 4C, the use of the dummy polysilicon structures 123 and 143 as shown in FIG. 4A, the PODE structures, creates capacitive loading as shown in the post-layout simulation models, as P123 for the polysilicon 123, and P143 for the polysilicon 143. As seen in FIG. 4C, each of the structures adds a three terminal device, or 3T device, to the schematic. The PODE structure P123 appears as a polysilicon gate over a source region and having a body terminal, so that three terminals—source, gate and body, are formed. The same is true for the P143 structure in the model for standard cell 140.

Figures 5A, 5B:
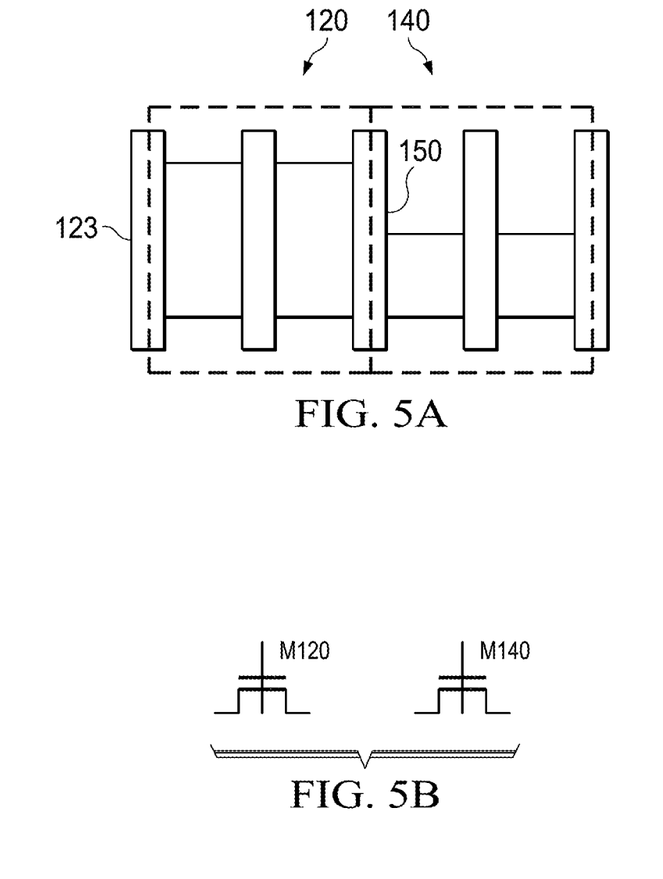
FIG. 5A illustrates, in a simplified plan view, the pair of standard cells of FIG. 4A after an abutment operation is used in an example embodiment.
FIG. 5B illustrates a pre-layout schematic of the pair of standard cells of FIG. 5A.
Figure 5C:
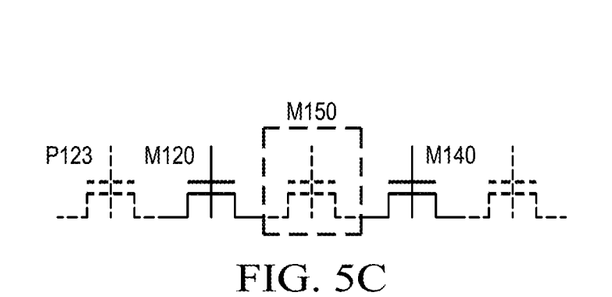
FIG. 5C illustrates a post-layout schematic for the pair of standard cells of FIG. 5A, including an abutted dummy polysilicon on a shared cell edge portion.

FIGS. 5A, 5B and 5C illustrate the standard cells 120 and 140 shown in FIGS. 4A, 4B and 4C above after an abutment placement process is performed. Because the PODE structures at the boundary of two adjacent standard cells, such as 120 and 140 in FIGS. 4A, 4B and 4C, can be shared, the place and route tools are designed to abut these adjacent cells by forming a single PODE structure at the common boundary of the two cells. This cell abutment process increases packing density of the standard cells on the integrated circuit by removing redundant structures and sharing the edge dummy polysilicon structures between the two cells.

As shown in FIG. 5A, standard cells 120 and 140 are now abutted and a common PODE structure 150 is shown at the shared cell boundary. In FIG. 5B, the pre-layout simulation schematics are shown for each cell 120 and 140, each provides a single MOS transistor M120, and M140; and the models in FIG. 5B do not include the PODE structures.

FIG. 5C depicts a post-layout simulation schematic that may be extracted from the layout of FIG. 5A including the capacitive loading of the PODE structures such as 123, 133, 143 of FIG. 4A. As shown in FIG. 5C the shared abutment PODE structure 150 forms what appears in a schematic view as another MOS device M150. The polysilicon 150 forms a gate overlying an active area and having a source on one side and a drain on the opposing side and a body terminal, so in the schematic sense it is just like the transistors M120 and M140. This is a four terminal device or 4T device. However, in fact the PODE 150 is a dummy structure, and the gate of polysilicon 150 should be tied to the substrate to avoid signal conflicts, so that no functional transistor will actually be formed in the layout.

In a conventional standard cell design flow, a layout versus schematic (LVS) comparison step is performed. The comparison is between a functional netlist schematic determined from a Verilog or HDL netlist schematic of the design to be manufactured, and this is compared to a second netlist schematic that is extracted from the device layout created by the automated place and route tools. The purpose of the LVS comparison is to ensure that the functional design netlist, which was created by a user to define the particular circuit function to be performed by the integrated circuit that is to be manufactured, is the same as the layout netlist that is extracted from the layout created by the automated place and route software tools. In this manner, the layout used in making the integrated circuit is known to match the designed netlist. That is, if the two netlists match, the layout is then verified as correct.

However, if the pre-layout models in the design netlist do not include the PODE structures, the conventional LVS compare will not match, because the post-layout netlist will then include elements (the PODE structures) not found in the pre-layout netlist schematic. This can be seen by comparing FIGS. 4B and 4C, above, and FIGS. 5B and 5C above. In order to use the PODE structures of the embodiments in a standard cell methodology, a new method is needed to ensure the LVS tool will show a match between the desired gate level netlist and the layout. Some modifications are needed to correctly perform layout versus verification, or LVS, including the PODE structures of the finFET standard cells.

Figure 6A:
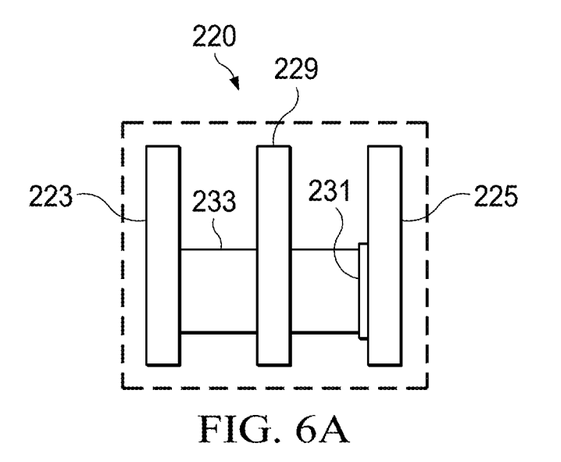
FIG. 6A illustrates in another plan view a layout for a standard cell of an embodiment.

FIGS. 6A and 6B illustrate a standard cell of one of the embodiments. In FIG. 6A, a plan view of a standard cell 220 is shown with a gate structure 229 intersecting and overlying an active area or OD area 233. Transistors may be formed where the gate 229 overlies an active area, and in various embodiments, a standard cell such as 220 may include multiple active areas, although in this simplified example, only one active area 233 is depicted. The fins in a finFET standard cell such as shown in FIG. 1 provide the active areas. In one example, a CMOS standard cell may include a fin for forming a NMOS finFET transistor and a second fin for providing a PMOS finFET transistor, in this manner a single standard cell can provide the two transistors needed for a CMOS inverter, which is a commonly used element in standard cell designs.

Figure 6B:
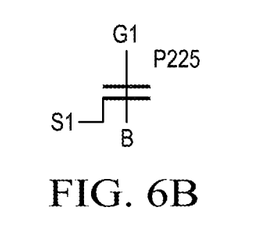
FIG. 6B illustrates a three terminal device for use with the netlist schematic for the standard cell in FIG. 6A.

FIG. 6A also includes a portion 231 which is a recognition layer. The purpose of this structure is to modify the netlist that will be used in the LVS comparison. As discussed above, the netlist obtained in the "netlist1" or the pre-layout schematic netlist that is used to model the cell does not include any devices corresponding to the PODE structures. In the various embodiments, the added recognition layer next to the PODE structures (such as recognition layer 231 next to the PODE structure 225 in FIG. 6A) will cause the design tools to extract a three terminal device representing the capacitive loading that the PODE structure 225 contributes to the design in the post-layout simulation netlist. When this device, shown in FIG. 6B as P225, is included in the post-layout netlist schematic, and subsequently the layout extracted netlist schematic is compared to the pre-layout netlist schematic in an LVS tool, the two netlist schematics will be different. Without a modification, the LVS process will not pass. That is, there will be an LVS mismatch.

In the various embodiments, a filter operation is used to address the PODE structures. The post-simulation netlist includes three terminal MOS and four terminal MOS devices that correspond to the PODE structures, as shown above in FIG. 5C. By using the recognition layers corresponding to the PODE structures to trigger a filter operation, in the LVS comparison each structure that corresponds to the dummy polysilicon in the post-simulation netlist is blocked out from the comparison in the LVS software tool. Because the remaining portions of the two netlists schematics match, the LVS tool will now correctly compare the pre-layout and post-layout netlist schematics. By using the embodiments, the PODE structures may be utilized and the existing design tools will operate correctly, without requiring any modifications.

Figure 7A:
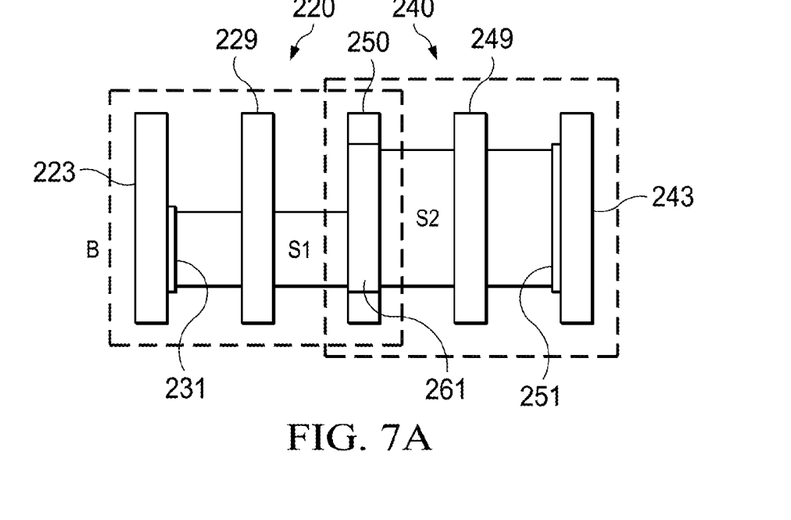
FIG. 7A illustrates, in a plan view, a layout for a pair of abutted standard cells for use with the embodiments.
Figure 7B:
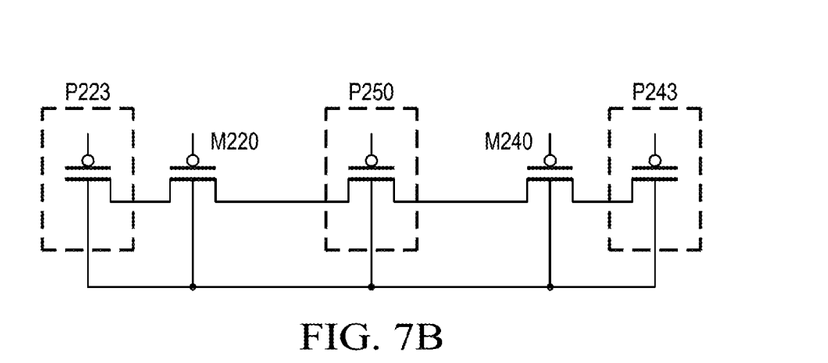
FIG. 7B illustrates a pre-layout schematic portion for the shared dummy polysilicon structure of the cells in FIG. 7A

FIGS. 7A and 7B illustrate in a plan view of a layout and in a schematic view the functional netlist schematic for two of the standard cells of an embodiment where the cells are abutted together. In FIG. 7A, the cells 220 and 240 are depicted and a common PODE dummy polysilicon gate structure 250 is shown where the cells abut one another. As described above the PODE structures are dummy structures and the polysilicon 250, which is basically a gate polysilicon layer, should be tied off to ground or to the substrate. However, as seen in FIG.

7B, which illustrates the post-layout simulation netlist that will be formed be a layout parameter extraction (LPE) tool, the structure appears in the post-layout simulation netlist as a four terminal MOS device P250, which looks the same as the transistors M220 and M240. Similarly, the PODE structures at the end of a cell such as 223 form a three terminal MOS device such as P223 in the post-layout netlist.

Returning to FIG. 7A, by including in the standard cell definition a recognition layer such as 231, 251 and 261 for the PODE structures such as 223, 250, and 243, the schematic that is extracted when the cells are used will correctly show the MOS devices such as P223, P250 and P243.

Figure 7C:
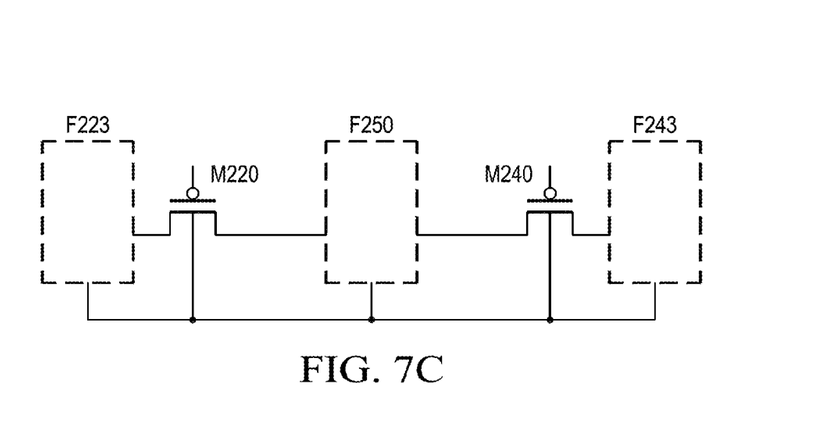
FIG. 7C illustrates the post-layout schematic for the shared dummy polysilicon structure in FIG. 7B.

By adding the recognition structures 231, 251, 261 to the standard cells, the layout versus schematic comparison in the various embodiments will operate correctly; because the post-layout schematic netlist that is extracted will also have the P250, P223, P243 in it, but the LVS tool will recognize these as dummy structures and will filter these dummy structures out of the LVS comparison. This filtering operation is illustrated in FIG. 7C, where the filters F223, F250 and F243 replace the three terminal and four terminal MOS devices P223, P250 and P243 in the LVS comparison process. Further, because the embodiment standard cells include the PODE structures in the post-layout netlist schematics, the post-layout simulations that are performed using this schematic netlist will be very accurate and provide improved simulator performance.

Use of the embodiments advantageously provides a correct LVS compare for standard cells using the polysilicon on OD edge (PODE) dummy structures. Further, by adding the recognition layers to the standard cell definitions, although the post-layout simulation netlists will more accurately reflect the loading and delays on the nets, and increased accuracy timing simulations are then possible, these elements do not appear in the pre-layout simulation netlists, keeping those simulations faster. Modeling the PODE dummy structures at the abutting edges as a four terminal MOS device further improves the post-layout simulation netlist, as it improves the accuracy of the simulations and better predicts the silicon device performance.

Figure 8:
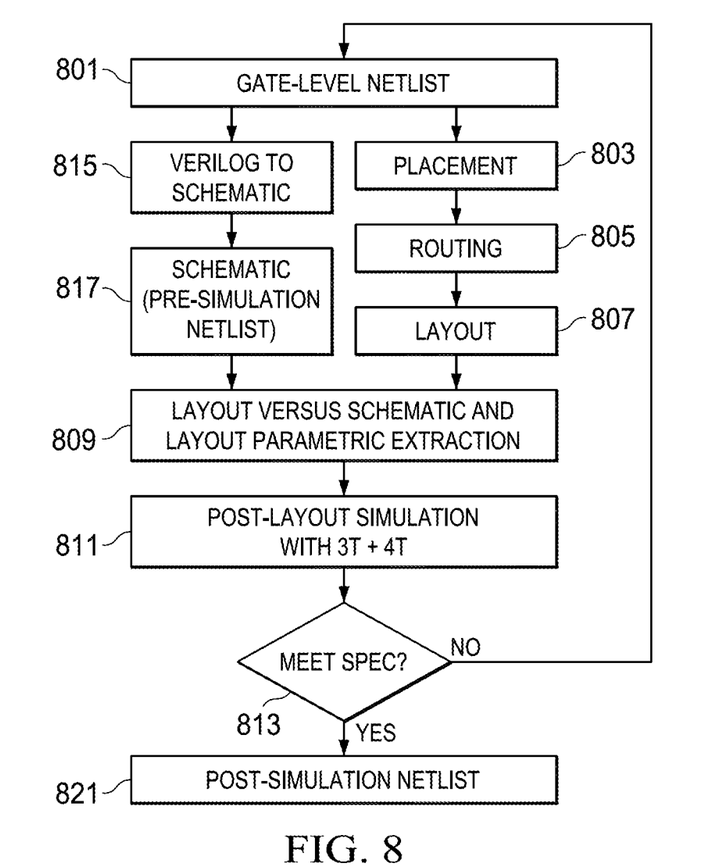
FIG. 8 illustrates, in a flow chart view, a method for use with the various embodiments. Corresponding numerals and symbols in the different figures generally refer to corresponding parts unless otherwise indicated. The figures are drawn to clearly illustrate the relevant aspects of the embodiments and are not necessarily drawn to scale.

FIG. 8 depicts, in a simplified flow diagram, a method embodiment for a novel standard cell design methodology for implementing a desired circuit described as a netlist. A gate level netlist is provided that defines the circuitry to be implemented using the standard cell approach. This netlist is used as input to the method in the flow chart, at step 801. At steps 815 and 817, this gate level netlist is transformed to a schematic form. In one example, the original netlist may be provided in a register-transfer language or other simulation language for circuit design, such as Verilog. A transformation program then transforms the Verilog into a schematic form. At step 817, the schematic is transformed into a pre-layout simulation netlist. At step 817, using the standard cells of the embodiments, the polysilicon on OD edge (PODE) dummy structures are not included shown in this pre-layout netlist.

In step 803, an automated placement tool creates a transistor level design using the gate level netlist and placing standard cells from a standard cell library to form the various logic and functional blocks from the gate level netlist. This automated placement tool can be an existing commercial software tool.

During placement, as described above, when the standard cells are abutted against one another, a common PODE structure is formed with an active area on either side of it as shown for example in FIG. 7A.

At step 805, an automatic routing tool then determines the connections needed between the devices in the standard cells, such as MOS transistors, for example, to implement the gate level netlist. Multiple transistors are coupled together to form adders, multiplexers, registers and the like in the routing step.

Once the routing is determined, automated layout tools are used at step 807 to map the standard cells and the interconnections from the router onto a semiconductor device using the process rules, and the design rules, that are provided. All of these software tools are available commercially and may be purchased. Standard cell libraries that are parameterized for certain semiconductor wafer manufacturing facilities, for example, for Taiwan Semiconductor Manufacturing Company (TSMC), are also commercially available.

At step 809, the layout is verified as correct. This is done by extracting a layout schematic from the layout provided at step 807 (using the layout parametric extraction tool or LPE), and then performing the layout versus schematic (LVS) comparison which compares each element in the post-layout schematic netlist to the pre-layout schematic netlist obtained from step 817. When using the embodiments, in the post-layout simulation netlist, the dummy polysilicon structures on the edge of the standard cells, the PODE structures as described above, are included as either a three terminal MOS device, or a four terminal MOS device (for the case where two cells abut one another). However, by using the recognition layers added to the standard cells for the dummy polysilicon structures, the LVS tool filters the dummy structures out of the comparison, and the comparison to the pre-layout simulation netlist does not include these PODE structures. Accordingly, even though the two netlists differ in this respect, the LVS compare will still pass if the remaining elements match.

If the design tools have correctly operated on the gate level netlist, the two schematics should match. The schematic netlist obtained from the layout of the standard cells using the embodiments includes the recognition layers shown in FIG. 7A, for example, and at each polysilicon on OD edge structure, the schematic extracted from the layout will include a 3 Terminal device such as P123 in FIG. 5C. Where two standard cells are abutted together, the layout schematic will include two of the three terminal devices coupled together as for device P250 in FIG. 7C, for example. The comparison in the LVS tool filters these three and four terminal devices out of the comparison process. The LVS tool is then comparing the same elements for both the pre-layout schematic netlist, and the post-layout schematic netlist, wherever the PODE structures are present in the standard cells of the embodiments, the filter blocks these from the compare.

Also at step 809, the layout parametric extraction (LPE) is performed. This extraction provides RC loading information, and includes parasitic devices that are not used in the LVS comparison. The LPE data is then added to the layout schematic to form a post-layout simulation netlist which includes information needed to simulate delays, loading, timing, rise and fall times, current hogging, current hot spots, and other electrical characteristics needed to confirm proper electrical performance of the circuit layout implemented using the standard cells.

At step 811, the post-layout simulation can be performed. The post-layout simulation netlist includes the LPE data for the PODE structures, and the LPE data from the abutted PODE structures that form where two of the standard cells are abutted together as in FIG. 7A.

At step 813, a design performance check is performed by a simulation of the proposed layout. If the simulation shows that the design meets the desired electrical performance then the method continues using the post-simulation netlist and a photomask generation tape (PG tape) may be output for the design at step 821 using the post-simulation netlist. If the design fails to meet the desired specifications, iteration is performed at step 813 and the gate level netlist must be modified in a manner to address the areas of the design that fail to meet the specification. The entire method is then repeated beginning at step 801.

Once the PG tape is output at step 821, photomasks may be fabricated for use in manufacturing the design as an integrated circuit using semiconductor wafer processing.

The following example netlist files are provided to illustrate the use of the embodiments in a simple example, such as shown in FIG. 7A, where two standard cells using the PODE structures abut one another. In the netlist files, the first cell provides an MOS device M0, and the second cell provides another MOS device M1, and there are PODE structures at each end, and an abutting PODE structure at the common boundary, such as shown in FIG. 7A. However, importantly, the PODE structures do not appear in the pre-layout simulation netlist.

The pre-layout simulation netlist schematic, which is a functional simulation netlist without parasitic and layout effects, is provided as Table 1:

TABLE 1

```
sample schematic (LVS) =====
.subckt nch_mac_rnpode G1 G2 G4 S1 S2 S3 B
M0 S1 G2 G1 B nch_mac
M1 S3 G4 S2 B nch_mac
.ends
```

The corresponding post-layout schematic, which includes the LPE layout parameters and the parasitic resistors, including the 3T devices used in the embodiments, is provided in Table 2:

TABLE 2

```
======== sample netlist (LPE)
=== .subckt nch_mac_rnpode G1 G2 G3 G4 G5 S1 S2 S3 B
XM0 S1 G2 G1 B nch_mac
XM1 S3 G4 S2 B nch_mac
X2 G1 G1 B npode_mac       <-- 3T PODE device - filtered for LVS
X3 S1 G3 S2 B nch_mpode_mac   <-- 4T PODE device- filtered for LVS
X5 S3 G5 B npode_mac       <-- 3T PODE device-filtered for LVS
.ends
```

As can be seen from examining the two netlists, the two netlists are different. The pre-layout netlist schematic of Table 1 includes only the two MOS devices M0, M1 in the standard cells. The post-layout netlist schematic of Table 2 includes the two MOS devices M0, M1 in the standard cells, but also a three terminal MOS device for each dummy polysilicon structure at the ends of the standard cells such as in FIG. 7A, for example, and a four terminal MOS device for the shared dummy polysilicon structure at the common boundary of the two standard cells. In the embodiments, the post-layout netlist schematic includes information that the LVS tool uses to filter out these devices that correspond to the dummy polysilicon structures from the LVS comparison. By examining Table 1 and Table 2 above, it can be seen that when these three and four terminal devices corresponding to the dummy polysilicon devices are filtered out, the remaining netlist elements in each table will match. Thus, the LVS compare in this simple example will pass.

As an additional advantage obtained in the various embodiments, the pre-layout simulation netlist is not modified to include the 3T and 4T devices that correspond to the PODE structures, so there is no change to the pre-layout simulation process needed to use the embodiments. Further, the post-layout simulation netlist includes these three and four terminal MOS devices corresponding to the dummy polysilicon, so the accuracy of the post-layout simulations is increased.

Use of the embodiments advantageously provides a standard cell with polysilicon on OD edge (PODE) structures, for example in various embodiments the PODE structures are advantageously used with finFET MOS devices, and the various embodiments are compatible with IC standard cell design flows using commercially available automated design tools. The use of a three terminal or four terminal MOS device to model the leakage currents and loading for the PODE structure in the standard cells increases the post-layout simulation accuracy while the use of the filters in the various embodiments assures that the layout versus schematic comparison is not affected.

Since those 3T or 4T PODE MOS devices are filtered for LVS compare, the LVS still can run hierarchically. Thus, run time needed for the LVS compare is not negatively affected.

In an embodiment, a method is disclosed including defining standard cells including at least one transistor and polysilicon dummy structures formed on cell edges; forming a pre-layout netlist schematic from an input gate level netlist using the standard cells, wherein the pre-layout netlist schematic does not include the polysilicon dummy structures; using the gate level netlist, performing an automated place and route process to form a layout netlist for fabricating an integrated circuit using the standard cells; laying out the standard cells and laying out routing connections between the standard cells to form a layout for the integrated circuit, using the layout netlist; extracting from the layout for the integrated circuit a post-layout netlist schematic, the post-layout netlist schematic including a MOS device for each polysilicon dummy structure of a standard cell in the layout netlist; and while using a filter to block the MOS devices corresponding to the polysilicon dummy structures from the post-layout netlist schematic, comparing the pre-layout netlist schematic to the post-layout netlist schematic.

In an additional embodiment, in the above methods, the MOS devices are three terminal MOS devices when the polysilicon dummy structures are at ends of the standard cells. In yet another embodiment, in the above methods, wherein the three terminal devices each comprise a MOS device with a source, gate and body terminal. In still a further embodiment, the above methods are performed and while performing the automated place and route process, where two of the standard cells are placed adjacent to one another, forming an abutted polysilicon dummy structure at a common boundary that is shared by the two adjacent standard cells. In still another embodiment, in the above methods, further comprising adding to the post-layout netlist schematic a four terminal MOS device for each of the abutted polysilicon dummy structures. In still another embodiment, in the above methods the four terminal devices each comprise a MOS device with a source, drain, and gate and body terminal. In a further embodiment, in the above methods, further comprising performing a layout parameter extraction process on the layout, adding resistance and capacitance to the post-layout netlist schematic. In yet another embodiment, in the above methods, further comprising performing a simulation of the electrical performance of the integrated circuit using the post-layout netlist schematic. In still another embodiment, in the above methods, the standard cells each further comprise at least one finFET device. In yet a further embodiment, the above methods are performed and further comprising forming a photomask generation output for an integrated circuit using the post-layout netlist schematic.

In an additional embodiment, a method for fabricating an integrated circuit includes defining a library of functions implemented as standard cells including finFET devices; in each standard cell, forming polysilicon dummy structures on cell edges overlying at least a portion of a fin of the finFET devices; defining a netlist schematic for each standard cell that includes a MOS device that corresponds to each of the polysilicon dummy structures; receiving a gate level netlist that defines a desired function to be implemented as an integrated circuit using the standard cells; forming a pre-layout netlist schematic using the standard cells, the pre-layout netlist schematic not including the polysilicon dummy structures in the standard cells; using the gate level netlist, performing an automated placement and route process to create a layout netlist implementing the defined function using the standard cells; performing a layout to implement the layout netlist on an integrated circuit; extracting a post-layout netlist schematic from the layout, the post-layout netlist schematic including a MOS device corresponding to each polysilicon dummy structure in the layout; comparing the pre-layout netlist schematic to the post-layout netlist schematic to obtain a compare result while using a filter to block the MOS devices from the post-layout netlist schematic; and responsive to the compare results, forming a photomask generation output from the post-layout netlist schematic.

In a further embodiment, the above methods include extracting layout parametric data from the layout and adding the layout parametric data to the post-layout netlist schematic; and using the layout parametric data and the post-layout netlist schematic, performing a simulation to determine whether the post-layout netlist schematic meets predetermined electrical characteristics. In yet another embodiment, in the above methods, the methods include determining that the post-layout netlist schematic fails to meet the predetermined electrical characteristics; and modifying the gate level netlist. In another embodiment, in the above methods, during the automated placement and route, for each pair of standard cells that are adjacent one another, forming a shared polysilicon dummy structure in the layout at a common boundary of the pair of standard cells. In still another embodiment, in the above methods, wherein for each of the shared polysilicon dummy structures, the post-layout netlist schematic includes a four terminal MOS device each having a gate terminal, a source terminal, drain terminal and a body terminal. In yet another embodiment, the above methods are performed, wherein during the comparison of the pre-layout netlist schematic to the post-layout netlist schematic, the MOS devices corresponding to the dummy polysilicon structures in the post-layout schematic netlist are not compared.

In yet another embodiment, a method for forming an integrated circuit includes receiving a gate level netlist defining a function for the integrated circuit; defining a standard cell library of predetermined blocks formed using finFET standard cells, each of finFET standard cells comprising at least one semiconductor fin, at least one polysilicon gate, and dummy polysilicon structures at one or more cell edges, the dummy polysilicon structures overlying a portion of the at least one semiconductor fin; from the gate level netlist, forming a pre-layout netlist schematic using the standard cells, the pre-layout netlist schematic not including the dummy polysilicon structures; using the gate level netlist, performing automated placement and routing of the standard cells to implement the function for the integrated circuit, and providing a layout netlist; forming a layout for implementing the function on the integrated circuit using the standard cells; extracting a post-layout netlist schematic from the layout, the post-layout netlist schematic including a MOS device for each dummy polysilicon structure in the layout; and verifying the layout by performing a layout versus schematic compare that compares the pre-layout netlist schematic to the post-layout netlist schematic, while performing the compare, filtering the MOS device corresponding to the dummy polysilicon structures from the post-layout netlist schematic.

In still a further embodiment, in the above methods, wherein during the automated placement and routing, for adjacent ones of the standard cells, forming an abutted dummy polysilicon structure at a common boundary of adjacent ones of the standard cells. In still another embodiment, in the above methods, for the abutted dummy polysilicon structures, the post-layout netlist schematic includes four terminal MOS devices each having a gate, a source, a drain and a body terminal. In still another embodiment, in the above methods, and further comprising providing, for each of the dummy polysilicon structures, a recognition layer such that during the compare, the dummy polysilicon structures may be blocked from the compare by a filter.

Although the example embodiments have been described in detail, it should be understood that various changes, substitutions and alterations can be made herein without departing from the spirit and scope of the application as defined by the appended claims. These devices, steps and materials may be varied while remaining within the scope of the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A method, comprising:
defining standard cells including at least one transistor and polysilicon dummy structures formed on cell edges;
forming a pre-layout netlist schematic from an input gate level netlist using the standard cells, wherein the pre-layout netlist schematic does not include the polysilicon dummy structures;
using the gate level netlist, performing using a processor an automated place and route process to form a layout netlist for fabricating an integrated circuit using the standard cells;
laying out the standard cells and laying out routing connections between the standard cells to form a layout for the integrated circuit, using the layout netlist;
extracting from the layout for the integrated circuit a post-layout netlist schematic, the post-layout netlist schematic including a MOS device for each polysilicon dummy structure of a standard cell in the layout netlist; and
while using a filter to block the MOS devices corresponding to the polysilicon dummy structures from the post-layout netlist schematic, comparing the pre-layout netlist schematic to the post-layout netlist schematic.

2. The method of claim 1, wherein the MOS devices are three terminal MOS devices when the polysilicon dummy structures are at ends of the standard cells.

3. The method of claim 2, wherein the three terminal devices each comprise a MOS device with a source, gate and body terminal.

4. The method of claim 1, and further comprising while performing the automated place and route process, where two of the standard cells are placed adjacent to one another, forming an abutted polysilicon dummy structure at a common boundary that is shared by the two adjacent standard cells.

5. The method of claim 4 and further comprising adding to the post-layout netlist schematic a four terminal MOS device for each of the abutted polysilicon dummy structures.

6. The method of claim 5, wherein the four terminal devices each comprise a MOS device with a source, drain, gate and body terminal.

7. The method of claim 1, and further comprising performing a layout parameter extraction process on the layout, adding resistance and capacitance to the post-layout netlist schematic.

8. The method of claim 1 and further comprising performing a simulation of the electrical performance of the integrated circuit using the post-layout netlist schematic.

9. The method of claim 1, wherein the standard cells each further comprise at least one finFET device.

10. The method of claim 1, and further comprising forming a photomask generation output for an integrated circuit using the post-layout netlist schematic.

11. A method for fabricating an integrated circuit, comprising:
 defining a library of functions implemented as standard cells including finFET devices;
 in each standard cell, forming polysilicon dummy structures on cell edges overlying at least a portion of a fin of the finFET devices;
 defining a netlist schematic for each standard cell that includes a MOS device that corresponds to each of the polysilicon dummy structures;
 receiving a gate level netlist that defines a desired function to be implemented as an integrated circuit using the standard cells;
 forming, using a processor, a pre-layout netlist schematic using the standard cells, the pre-layout netlist schematic not including the polysilicon dummy structures in the standard cells;
 using the gate level netlist, performing an automated placement and route process to create a layout netlist implementing the defined function using the standard cells;
 performing a layout to implement the layout netlist on an integrated circuit;
 extracting a post-layout netlist schematic from the layout, the post-layout netlist schematic including a MOS device corresponding to each polysilicon dummy structure in the layout;
 comparing the pre-layout netlist schematic to the post-layout netlist schematic to obtain a compare result while using a filter to block the MOS devices from the post-layout netlist schematic; and
 responsive to the compare results, forming a photomask generation output from the post-layout netlist schematic.

12. The method of claim 11, and further comprising extracting layout parametric data from the layout and adding the layout parametric data to the post-layout netlist schematic; and
 using the layout parametric data and the post-layout netlist schematic, performing a simulation to determine whether the post-layout netlist schematic meets predetermined electrical characteristics.

13. The method of claim 12, and further comprising:
 determining that the post-layout netlist schematic fails to meet the predetermined electrical characteristics; and
 modifying the gate level netlist.

14. The method of claim 11, wherein during the automated placement and route, for each pair of standard cells that are adjacent one another, forming a shared polysilicon dummy structure in the layout at a common boundary of the pair of standard cells.

15. The method of claim 14, wherein for each of the shared polysilicon dummy structures, the post-layout netlist schematic includes a four terminal MOS device each having a gate terminal, a source terminal, drain terminal and a body terminal.

16. The method of claim 15, wherein during the comparison of the pre-layout netlist schematic to the post-layout netlist schematic, the MOS devices corresponding to the dummy polysilicon structures in the post-layout schematic netlist are not compared.

17. A method for forming an integrated circuit, comprising:
 receiving a gate level netlist defining a function for the integrated circuit;
 defining a standard cell library of predetermined blocks formed using finFET standard cells, each of finFET standard cells comprising at least one semiconductor fin, at least one polysilicon gate, and dummy polysilicon structures at one or more cell edges, the dummy polysilicon structures overlying a portion of the at least one semiconductor fin;
 from the gate level netlist, forming using a processor a pre-layout netlist schematic using the standard cells, the pre-layout netlist schematic not including the dummy polysilicon structures;
 using the gate level netlist, performing automated placement and routing of the standard cells to implement the function for the integrated circuit, and providing a layout netlist;
 forming a layout for implementing the function on the integrated circuit using the standard cells;
 extracting a post-layout netlist schematic from the layout, the post-layout netlist schematic including a MOS device for each dummy polysilicon structure in the layout; and
 verifying the layout by performing a layout versus schematic compare that compares the pre-layout netlist schematic to the post-layout netlist schematic, while performing the compare, filtering the MOS device corresponding to the dummy polysilicon structures from the post-layout netlist schematic.

18. The method of claim 17, and further comprising:
 during the automated placement and routing, for adjacent ones of the standard cells, forming an abutted dummy polysilicon structure at a common boundary of adjacent ones of the standard cells.

19. The method of claim 18, wherein for the abutted dummy polysilicon structures, the post-layout netlist schematic includes four terminal MOS devices each having a gate, a source, a drain and a body terminal.

20. The method of claim 19, and further comprising providing, for each of the dummy polysilicon structures, a recognition layer such that during the compare, the dummy polysilicon structures may be blocked from the compare by a filter.

* * * * *